US011922721B2

(12) United States Patent
Ye et al.

(10) Patent No.: US 11,922,721 B2
(45) Date of Patent: Mar. 5, 2024

(54) INFORMATION DISPLAY METHOD, DEVICE AND STORAGE MEDIUM FOR SUPERIMPOSING MATERIAL ON IMAGE

(71) Applicant: Beijing Bytedance Network Technology Co., Ltd., Beijing (CN)

(72) Inventors: Chunmei Ye, Beijing (CN); Jiabin Huang, Beijing (CN); Yitong Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/820,163

(22) Filed: Aug. 16, 2022

(65) Prior Publication Data

US 2022/0392254 A1 Dec. 8, 2022

Related U.S. Application Data

(63) Continuation of application No. PCT/CN2021/114665, filed on Aug. 26, 2021.

(30) Foreign Application Priority Data

Aug. 26, 2020 (CN) .......................... 202010874067.3

(51) Int. Cl.
*G06V 40/16* (2022.01)
*G06T 11/60* (2006.01)
(Continued)

(52) U.S. Cl.
CPC ............ *G06V 40/161* (2022.01); *G06T 11/60* (2013.01); *G06V 10/242* (2022.01);
(Continued)

(58) Field of Classification Search
CPC .. G06V 40/161; G06V 10/242; G06V 10/774; G06V 40/168; G06T 7/0008;
(Continued)

(56) References Cited

U.S. PATENT DOCUMENTS 11,216,648 B2 * 1/2022 Sun ...................... G06V 10/772
11,501,573 B1 * 11/2022 Tighe .................... G06V 40/20
(Continued)

FOREIGN PATENT DOCUMENTS

CN 109147007 A 1/2019
CN 111325129 A 6/2020
(Continued)

OTHER PUBLICATIONS

Notification to Grant Right for Invention for Chinese Patent Application No. 2020108740673, dated Aug. 9, 2021 (6 pages).
(Continued)

Primary Examiner — Jin Cheng Wang
(74) Attorney, Agent, or Firm — ARENTFOX SCHIFF LLP

(57) ABSTRACT

An information display method, a device and a storage medium. The method includes: acquiring a first image including a first object in a video, determining whether a second object is present in the first image, and when it is determined that the second object is present in the first image and that the second object satisfies a preset positional relationship with the first object, superimposing a first material on an area where the second object is located in the first image. Using the above method, it is realized that when the second object is detected in the image, any material is superimposed on the area where the second object is located, so as to avoid the problem of not being able to use part of
(Continued)

special effects or express information when the second object satisfies the preset positional relationship with the first object.

17 Claims, 9 Drawing Sheets

(51) Int. Cl.
*G06V 10/24* (2022.01)
*G06V 10/774* (2022.01)

(52) U.S. Cl.
CPC .......... *G06V 10/774* (2022.01); *G06V 40/168* (2022.01); *G06T 2200/24* (2013.01)

(58) Field of Classification Search
CPC ............. G06T 7/11; G06T 2207/20081; G06T 2207/20084; G06T 7/73; G06T 2207/30201; G06T 2207/10016; G06T 5/50; G06T 11/00; G06T 2200/24; G06T 11/60
See application file for complete search history.

(56) References Cited

U.S. PATENT DOCUMENTS

| | | | |
|---|---|---|---|
| 2017/0024632 A1 | 1/2017 | Johnson et al. | |
| 2017/0221371 A1* | 8/2017 | Yang | G06T 11/60 |
| 2018/0182141 A1 | 6/2018 | Caballero et al. | |
| 2018/0268608 A1* | 9/2018 | Schneider | G06F 3/04815 |
| 2019/0050710 A1* | 2/2019 | Wang | G06N 3/084 |
| 2019/0087647 A1* | 3/2019 | Du | G06V 40/169 |
| 2019/0236342 A1* | 8/2019 | Madden | G08B 13/19602 |
| 2019/0370996 A1* | 12/2019 | Yabuuchi | G06V 40/161 |
| 2019/0377967 A1* | 12/2019 | Yabuuchi | G06F 9/3005 |
| 2020/0012887 A1* | 1/2020 | Li | G06V 40/161 |
| 2020/0034603 A1* | 1/2020 | Yamada | G06T 7/50 |
| 2020/0042769 A1* | 2/2020 | Yan | G06V 40/161 |
| 2020/0042770 A1* | 2/2020 | Yan | G06V 10/26 |
| 2020/0294243 A1* | 9/2020 | Li | G06T 7/11 |
| 2020/0327309 A1* | 10/2020 | Cheng | G06N 3/08 |
| 2020/0327647 A1* | 10/2020 | Su | G06T 11/60 |
| 2021/0152751 A1* | 5/2021 | Huang | H04N 5/265 |
| 2021/0295015 A1* | 9/2021 | Lei | G06N 3/084 |
| 2022/0044007 A1* | 2/2022 | Saleh | G06V 40/20 |
| 2022/0058426 A1* | 2/2022 | Song | G06F 18/214 |

FOREIGN PATENT DOCUMENTS

| | | |
|---|---|---|
| CN | 111401202 A | 7/2020 |
| CN | 111414887 A | 7/2020 |
| CN | 111428604 A | 7/2020 |
| CN | 111444869 A | 7/2020 |
| CN | 111444894 A | 7/2020 |
| CN | 111460962 A | 7/2020 |
| CN | 111507199 A | 8/2020 |
| CN | 111523473 A | 8/2020 |
| CN | 111541950 A | 8/2020 |
| CN | 111582068 A | 8/2020 |
| CN | 111582199 A | 8/2020 |
| CN | 112001872 A | 11/2020 |
| EP | 2653772 A1 | 10/2013 |
| JP | 2004171543 A | 6/2004 |
| JP | 2005316888 A | 11/2005 |
| JP | 2006228061 A | 8/2006 |
| JP | 2010003117 A | 1/2010 |
| JP | 2017011634 A | 1/2017 |
| JP | 2019527410 A | 9/2019 |
| KR | 20090088675 A | 8/2009 |

OTHER PUBLICATIONS

First Office Action for Chinese Patent Application No. 2020108740673, dated Apr. 16, 2021 (18 pages).
Zhang et al., "ShuffleNet: An Extremely Efficient Convolutional Neural Network for Mobile Devices," 2018 IEEE/CVF Conference on Computer Vision and Pattern Recognition, pp. 6848-6856 (2018).
Unmask: Expression Mask, dated Dec. 29, 2014 (5 pages).
Niu et al., "Improved algorithm of RetinaFace for natural scene mask wear detection," Computer Engineering and Applications, 56(12), pp. 1-7 (2020).
International Search Report and Written Opinion for International Patent Application No. PCT/CN2021/114665, dated Nov. 25, 2021 (16 pages).
Office Action dated Jul. 18, 2023 in Japanese Application No. 2023-513472, 11 pages.
Office Action dated Oct. 26, 2023, in Russian Application No. 2023106938, 15 pages.
Extended European Search Report dated Jan. 8, 2024, in European Application No. 21860459.3, 13 pages.
Nizam Us Din et al., "A Novel GAN-Based Network for Unmasking of Masked Face", IEEE Access, IEEE, vol. 8, (Feb. 28, 2020), 12 pages.
Ningning Ma et al., "ShuffleNet V2: Practical Guidelines for Efficient CNN Architecure Design", Advances in Databases and Information Sustems; [Lecture Notes in Computer Science; Lect. Notes Computer], Springer International Publishing, CRAM, (Oct. 9, 2018), 17 pages.
Yu-Hui Lee et al., "ByeGlassesGAN: Identity Preserving Eyeglass Removal for Face Images", arxiv.org, Cornell University Library, 201 Olin Library Cornell University Ithaca, NY 14853, (Aug. 25, 2020), 16 pages.

* cited by examiner

○ represent key point

INFORMATION DISPLAY METHOD, DEVICE AND STORAGE MEDIUM FOR SUPERIMPOSING MATERIAL ON IMAGE

CROSS-REFERENCE TO RELATED APPLICATIONS

This application is a continuation of International Application No. PCT/CN2021/114665, filed on Aug. 26, 2021, which claims priority to Chinese Patent Application No. 202010874067.3, filed to the China National Intellectual Property Administration on Aug. 26, 2020 and entitled "INFORMATION DISPLAY METHOD, DEVICE AND STORAGE MEDIUM". The disclosures of the above patent applications are hereby incorporated by reference in their entireties.

TECHNICAL FIELD

Embodiments of the present disclosure relate to the field of computer and network communication technologies and, in particular, to an information display method, a device and a storage medium.

BACKGROUND

With the rapid spread of the novel coronavirus, the epidemic has brought some impact on daily lives, social communication and work of users worldwide. For example, the users need to wear face masks when social distance cannot be guaranteed. The face masks have become items that will currently be used by the users worldwide.

Currently, an application (APP for short) on a terminal device, such as a short video APP, can achieve an interesting interactive experience by recognizing a user's face and wearing a virtual face mask for the user. However, when the user is in a special scenario, such as when the user needs to wear a face mask while taking transportation or in an indoor public space, the current APP lacks an interactive operation, resulting in a poor user experience.

SUMMARY

Embodiments of the present disclosure provide an information display method, a device and a storage medium to overcome the problem that a user is unable to use a facial special effect or express information after wearing a face mask, thereby enhancing use experience of the user.

In a first aspect, an embodiment of the present disclosure provides an information display method, including:
  acquiring a first image including a first object in a video;
  determining whether a second object is present in the first image;
  when it is determined that the second object is present in the first image and that the second object satisfies a preset positional relationship with the first object, superimposing a first material on an area where the second object is located in the first image.

In a second aspect, an embodiment of the present disclosure provides an information display device, including:
  an acquiring module, configured to acquire a first image including a first object in a video;
  a processing module, configured to determine whether a second object is present in the first image;
  a display module, configured to superimpose a first material on an area where the second object is located in the first image, when it is determined that the second object is present in the first image and that the second object satisfies a preset positional relationship with the first object.

In a third aspect, an embodiment of the present disclosure provides an electronic device, including:
  at least one processor and a memory;
  where the memory stores computer-execution instructions;
  the at least one processor executes the computer-execution instructions stored in the memory to cause the at least one processor to execute the information display method according to the first aspect above and various possible designs of the first aspect.

In a fourth aspect, an embodiment of the present disclosure provides a computer-readable storage medium, where the computer-readable storage medium stores computer-execution instructions, and when a processor executes the computer-execution instructions, the information display method according to the first aspect above and various possible designs of the first aspect is implemented.

In a fifth aspect, an embodiment of the present disclosure provides a computer program product including a computer program, where the information display method according to the first aspect above and various possible designs of the first aspect is implemented when the computer program is executed by a processor.

In a sixth aspect, an embodiment of the present disclosure also provides a computer program, where the information display method according to the first aspect above and various possible designs of the first aspect is implemented when the computer program is executed by a processor.

Embodiments of the present disclosure provide an information display method, a device and a storage medium. The method includes: acquiring a first image including a first object in a video, determining whether a second object is present in the first image, and superimposing a first material on an area where the second object is located in the first image when it is determined that the second object is present in the first image and that the second object satisfies a preset positional relationship with the first object. Using the above method, it is realized that when the second object is detected in the image, any material is superimposed on the area where the second object is located, so as to avoid the problem of not being able to use part of special effects or express information when the second object satisfies the preset positional relationship with the first object.

BRIEF DESCRIPTION OF DRAWINGS

In order to explain technical solutions of embodiments of the present disclosure or in the prior art more clearly, the accompany drawings that need to be used in the description of the embodiments or the prior art will be briefly introduced in the following. Obviously, the drawings in the following description are some embodiments of the present disclosure, and for those of ordinary skilled in the art, other drawings can also be obtained according to these drawings without paying creative effort.

DESCRIPTION OF EMBODIMENTS

Figure 1:
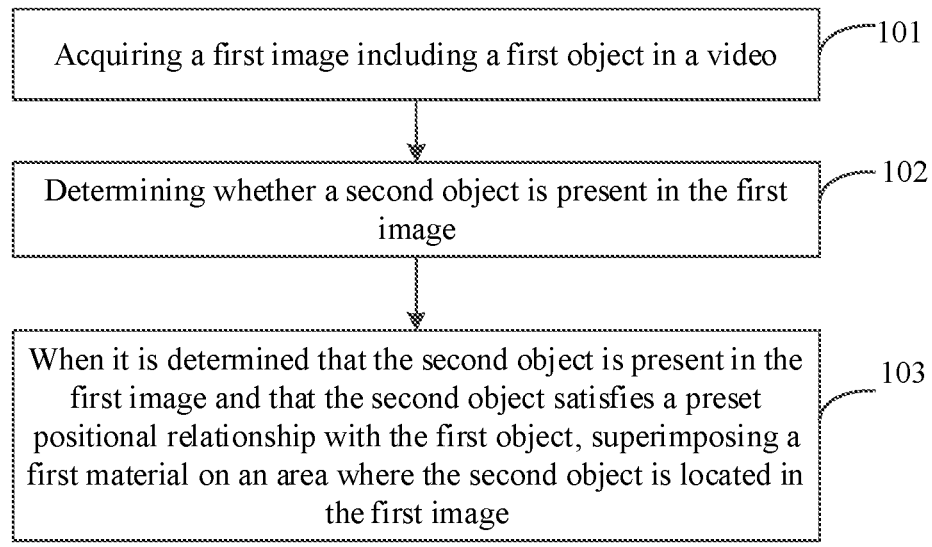
FIG. 1 is a schematic flowchart of an information display method provided by an embodiment of the present disclosure.

In order to make the objections, technical solutions and advantages of embodiments of the present disclosure clearer, the technical solutions in the embodiments of the present disclosure will be described clearly and comprehensively with reference to the drawings in the embodiments of the present disclosure. Obviously, the described embodiments are part of the embodiments of the present disclosure, rather than all of them. Based on the embodiments in the present disclosure, all other embodiments obtained by those of ordinary skilled in the art without creative effort belong to the protection scope of the present disclosure.

In the context of the normalization of the global epidemic caused by the novel coronavirus, face masks have become regular items used by users worldwide in their daily lives, social communication and work. Before the outbreak of the epidemic, the users could visually express their emotions, expressions, status and the like when using applications on terminal devices for filming, video chatting or live streaming. However, with the normalization of the global epidemic, when the users are in special scenarios, such as taking public transportation or in indoor public spaces, the users need to wear face masks to cover their faces. At this time, the users cannot use some facial special effects in the applications, nor can they visually express their emotions, expressions, status, etc. Embodiments of the present disclosure provide an information display method to solve the above problems.

An embodiment of the present disclosure provides an information display method: determining whether a face in an image wears a face mask by acquiring the image including the face and performing image analysis on a face area in the image, and prompting the user to put on the face mask when it is determined that the face in the image does not wear the face mask, so as to display preset information or user-defined information, such as displaying stickers, text, expressions and the like, on the face mask worn by the user to realize that the user expresses emotions, expressions, states and the like while wearing the face mask, thereby enhancing use experience of the user.

In addition to the scenario where the user wears a face mask on the face, actual application scenarios may also include a user wearing sunglasses on the eyes, a user wearing a hat on the head, etc., which is not limited by the embodiments of the present disclosure. For a broader application scenario, an embodiment of the present disclosure also provides an information display method: acquiring an image including a first object in a video, determining whether a second object is present in the image, and when it is determined that the second object is present in the image and the second object satisfies a preset positional relationship with the first object, superimposing preset information or user-defined information on an area where the second object is located in the image, such as displaying stickers, text, expressions and the like, to avoid the problem of not being able to use part of special effects or express information when the second object satisfies the preset positional relationship with the first object.

It should be noted that the information display method provided by the embodiments of the present disclosure may be applied to a video chatting scenario, a filming scenario, a live streaming scenario and the like, and of course, may also be applied to other scenarios where facial images of people need to be captured, which is not limited by the embodiments of the present disclosure.

The technical solutions of the present disclosure will be described in detail with specific embodiments below. The following specific embodiments may be combined with each other, and the same or similar concepts or processes may not be repeated in some embodiments.

Exemplarily, FIG. 1 is a schematic flowchart of an information display method provided by an embodiment of the present disclosure. The method of this embodiment can be applied in a terminal device or a server. As shown in FIG. 1, the information display method includes the following steps.

Step 101, acquiring a first image including a first object in a video.

Step 102, determining whether a second object is present in the first image.

In this embodiment, the first object may be any body part such as the face, head, hand of a person, and the second object may be any object that satisfies a preset positional relationship with the body part. Exemplarily, the first object is the face of the person, and the second object may be objects such as a face mask, sunglasses, a hat, etc.

In an embodiment of the present disclosure, it may be determined whether the second object is present in the first image through a recognition model of the second object. The recognition model may use any kind of deep learning models, or, lightweight machine learning models. Different second objects correspond to different recognition models, and specific examples can be found in the following embodiments.

Step 103, superimposing a first material on an area where the second object is located in the first image, when it is determined that the second object is present in the first image and the second object satisfies a preset positional relationship with the first object.

In this embodiment, that the second object satisfies the preset positional relationship with the first object includes the following forms:

the first object is a human face and the second object is a face mask, then satisfying the preset positional relationship may specifically be that the human face wears the face mask. The first object is a human face and the second object is sunglasses, then satisfying the preset positional relationship may specifically be that the human face wears the sunglasses. The first object is a hand and the second object is a glove, then satisfying the preset positional relationship may specifically be that the person's hand wears the glove. The above examples are only exemplary, and other positional relationships between the first object and the second object are within the protection scope of the embodiments of the present disclosure.

Optionally, in some embodiments, after superimposing the first material on the area where the second object is located in the first image, the method further includes: when it is determined that the second object is not present in a second image after the first image, removing the first material and superimposing a second material in the second image, where the second material is different from the first material.

Optionally, in some embodiments, after superimposing the first material on the area where the second object is located in the first image, the method further includes: acquiring a switching operation of the user for the first material displayed in the first image; removing the first material and superimposing a third material in the second image after the first image in response to the switching operation, where the third material is different from the first material.

Optionally, the switching operation includes any one of the following: a gesture operation, a facial action, a head action, a voice control, a selection operation in a material selection area of an interface, and an input operation in a text input area of the interface.

Optionally, the third material is text information or an expression inputted by the user in the text input area of the interface.

As can be seen from the above description, the information display method provided by this embodiment includes: acquiring the first image including the first object in the video, determining whether the second object is present in the first image, and superimposing the first material on the area where the second object is located in the first image when it is determined that the second object is present in the first image and the second object satisfies the preset positional relationship with the first object. Using the above method, it is realized that when the second object is detected in the image, any material is superimposed on the area where the second object is located, so as to avoid the problem of not being able to use part of special effects or express information when the second object satisfies the preset positional relationship with the first object.

An information display solution provided by an embodiment of the present disclosure will be described in detail below, by taking a human face as the first object and a face mask as the second object as an example. In this scenario, that the second object satisfies the preset positional relationship with the first object specifically refers to that the human face wears the face mask.

Figure 2:
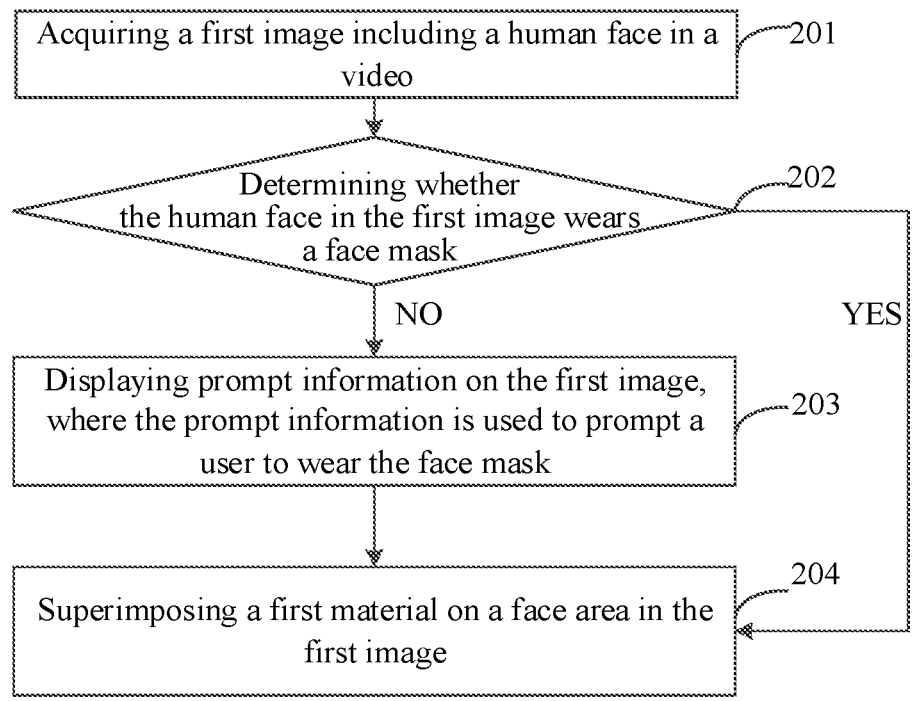
FIG. 2 is a schematic flowchart of an information display method provided by an embodiment of the present disclosure.

Exemplarily, FIG. 2 is a schematic flowchart of an information display method provided by an embodiment of the present disclosure. The method of this embodiment can be applied in a terminal device or a server. As shown in FIG. 2, the information display method includes the following steps.

Step 201, acquiring a first image including a human face in a video.

Specifically, the first image which is captured by a camera of the terminal device and includes the human face is acquired, and the human face in the picture may or may not wear a face mask.

Step 202, determining whether the human face in the first image wears a face mask.

In an embodiment of the present disclosure, determining whether the human face in the first image wears the face mask includes: acquiring a target image including the human face in the first image; inputting the target image into a face mask recognition model to obtain a recognition result, where the recognition result is used to indicate whether the human face wears the face mask. Using a pre-trained face mask recognition model, the efficiency and accuracy of recognizing whether the human face in the first image wears the face mask can be improved.

It should be noted that the above target image may be the first image itself or an image of a human face area after pre-processing the first image. Please refer to the following embodiments for a specific pre-processing process, which will not be detailed here.

In an embodiment of the present disclosure, a deep learning model can be used for the face mask recognition model, such as VGG, ResNet, GoogleNet, MobileNet, ShuffleNet, etc. The computational amount of different models is different. The embodiments of the present disclosure do not impose any limitation on this.

In an embodiment of the present disclosure, a lightweight machine learning model can be used for the face mask recognition model to meet image processing requirements of a mobile terminal, that is, a simple model with a small computational amount and high computational efficiency can be deployed on the mobile terminal.

Figure 3:
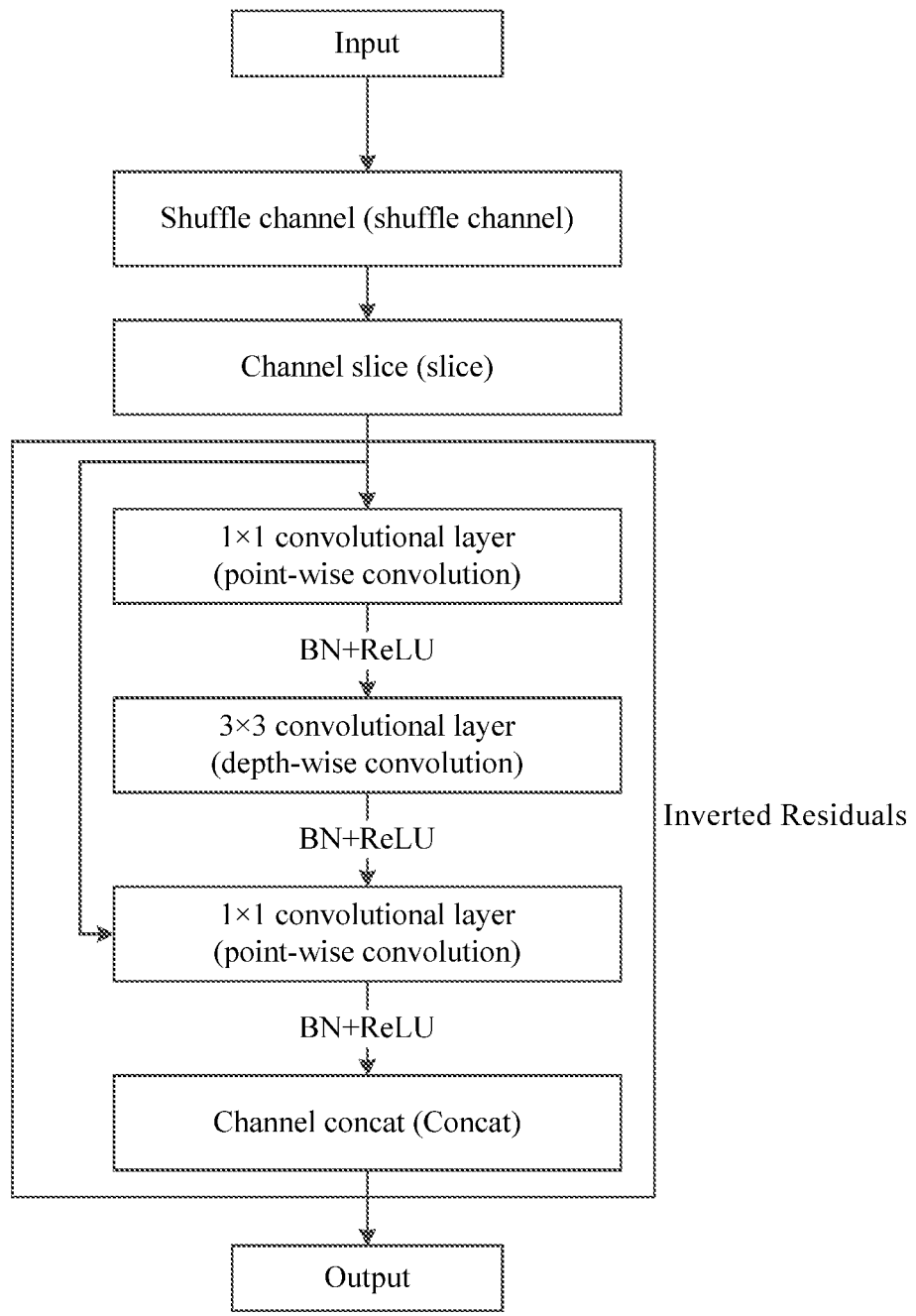
FIG. 3 is a schematic diagram of an internal structure of a face mask recognition model provided by an embodiment of the present disclosure.

Optionally, a lightweight machine learning model such as MobileNet and ShuffleNet, can be used for the face mask recognition model of this embodiment, and the internal structure of the model is shown in FIG. 3. The internal structure of the model includes a shuffle channel (shuffle channel) module, a channel slice (slice) module, a 1×1 convolution module (pointwise convolution), a 3×3 convolution module (depth-wise convolution), a 1×1 convolution module (point-wise convolution), and a channel concat (concat) module, where BN (Batch Normalization) and ReLU can be included both between the 1×1 convolution module and the 3×3 convolution module, and between the 1×1 convolution module and the channel concat module. BN is a linear transformation of statistical data distribution characteristics and ReLU is a simple and efficient nonlinear activation function.

The basic idea of the above model is to turn traditional convolution into separable convolution, i.e. depth-wise convolution and point-wise convolution, with the aim of reducing the computational amount. The shuffle channel is used to improve the expression capability of the model. In addition, inverted residuals can be used to improve the feature extraction capability of depth-wise convolution. It should be noted that the diagram of module connection inside the face mask recognition model shown in FIG. 3 is only an example, and the internal structure of the model can be adjusted according to the application requirements, which is not limited by this embodiment.

In an embodiment of the present disclosure, the target image may be the first image itself, then step 202 specifically includes: inputting the first image into the face mask recognition model to obtain a recognition result.

Figure 4A:
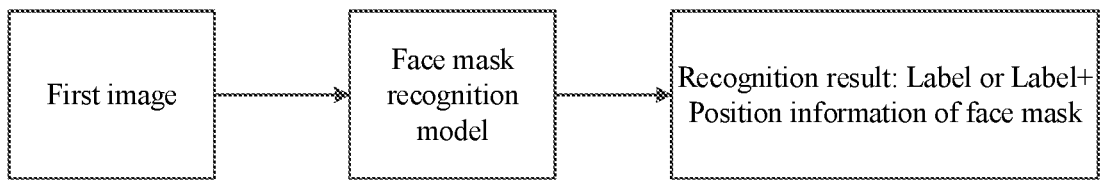
FIG. 4a is a schematic diagram of a processing method of an image provided by an embodiment of the present disclosure.

Exemplarily, FIG. 4a is a schematic diagram of a processing method of an image provided by an embodiment of the present disclosure. As shown in FIG. 4a, the first image is inputted into the face mask recognition model, and the recognition result of the first image is outputted through image analysis of the face mask recognition model. The recognition result is used to determine whether the human face in the first image wears the face mask.

As an example, the recognition result includes a label for indicating whether the human face in the first image wears the face mask, which for example, may be a label value, a value range of the label value being between 0 and 1. Specifically, the label value being 0 indicates that the human face in the first image does not wear the face mask; the label value being 1 indicates that the human face in the first image wears the face mask. It can be understood that the closer the label value is to 1, the higher the probability that the human face in the first image wears the face mask.

As another example, the recognition result includes a label for indicating that the human face in the first image wears the face mask and position information of the face mask worn by the human face in the first image.

Optionally, the position information of the face mask in the recognition result includes at least one of key point information of the face mask and image mask information of the face mask.

The key point information of the face mask may be expressed by normalized coordinate values of a key point of the face mask, and may also be expressed in the form of a heatmap, which is not limited in this embodiment.

Exemplary, the model directly outputs normalized xy coordinates of the key point of the face mask, such as (0.25, 0.5), and if the face mask has N key points, an N×2 matrix is outputted.

Exemplary, the model outputs the heatmap of the key points of the face mask, and each key point corresponds to one heatmap. The heatmap has a same size as an input image of the model. A value range of each pixel on the heatmap is 0-1, and a position of the pixel with the maximum value on the heatmap represents key point position of the face mask.

Image mask information of the face mask may be a binary image, and a mask image outputted by the model has a same size as the input image of the model. For example, the input image of the model is an image with 128×128 resolution, and the output of the model includes a 128×128 mask image. A value range of each pixel on the mask image is also 0 to 1, which represents a probability of each pixel falling on the face mask.

In an embodiment of the present disclosure, the above target image may be the image of the human face area after pre-processing the first image, and acquiring the target image including the human face in the first image may include: inputting the first image into a first human face recognition model to obtain a first image of the human face area in the first image, and using the first image as the target image.

It should be noted that the first image obtained through the first human face recognition model includes human face images with different angles, such as human face images of front face, side face, face tilted left and right, side face tilted up and down, etc.

Figure 4B:
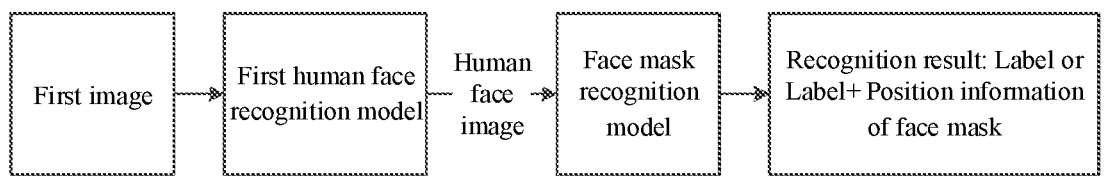
FIG. 4b is a schematic diagram of a processing method of an image provided by an embodiment of the present disclosure.

Exemplarily, FIG. 4b is a schematic diagram of a processing method of an image provided by an embodiment of the present disclosure. As shown in FIG. 4b, firstly, the first image is inputted into the first human face recognition model to obtain an image of the human face area in the first image. Then the image of the human face area in the first image is inputted into the face mask recognition model, and a recognition result of the face mask is outputted through image analysis of the face mask recognition model. The recognition result is the same as the above example, which will not be repeated here. The above first human face recognition model is used to recognize a person's face in an image and the position of the person's face in the image, and the first human face recognition model can use any one of the above deep learning models or lightweight machine learning models, which is not limited in this embodiment.

As can be seen from the above description, compared with the first example (the example shown in FIG. 4a), in the second example (the example shown in FIG. 4b), face recognition of the person in the first image is added, and the face image is inputted into the face mask recognition model, which can greatly reduce the computational amount of the face mask recognition model and improve the speed and accuracy of face mask detection.

In an embodiment of the present disclosure, the above target image may be the image of the human face area after pre-processing the first image, and acquiring the target image including the human face in the first image may include: inputting the first image into a second human face recognition model to obtain a first image of the human face area in the first image and key point information of the human face area; performing rotation processing on the first image according to the key point information to obtain a second image, and using the first image as the target image.

It should be noted that through the second human face recognition model, in addition to obtaining the first image of the human face area in the first image, the key point information in the first image, i.e., position information of key parts of the human face area (such as coordinate positions of the eyes, nose, eyebrows, mouth and other parts of the face), is also included. The second image may be a standard face image of a front face or a side face. Exemplarily, when the person's face in the first image is tilted to the left, after rotation processing, a corrected image of the person's front face can be obtained. When the first image is an image of the person's side face and the face is tilted upwards, after rotation processing, an image of the person's side face with the corrected direction can be obtained.

Figure 4C:
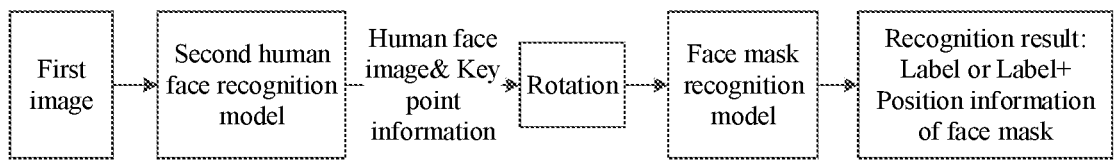
FIG. 4c is a schematic diagram of a processing method of an image provided by an embodiment of the present disclosure.

Exemplarily, FIG. 4c is a schematic diagram of a processing method of an image provided by an embodiment of the present disclosure. As shown in FIG. 4c, firstly, the first image is inputted into the second human face recognition model to obtain an image of the human face area in the first image and key point information of the human face area. Then the human face image in the first image is rotated based on the key point information to obtain a standard human face image. Then the standard human face image is inputted into the face mask recognition model, and a recognition result of the face mask is outputted through image analysis of the face mask recognition model. The recognition result is the same as the above example, which will not be repeated here. The above second human face recognition model is used to recognize a person's face in an image and the position of key parts of the person's face. The second face recognition model can use any one of the above deep learning models or lightweight machine learning models, which is not limited by this embodiment.

Figure 4D:
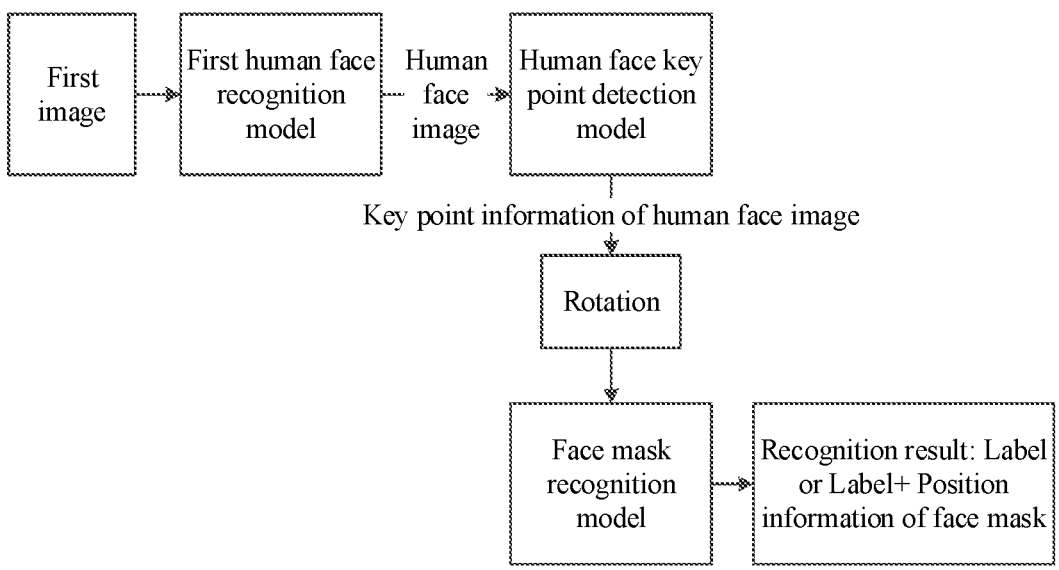
FIG. 4d is a schematic diagram of a processing method of an image provided by an embodiment of the present disclosure.

Optionally, in a possible implementation, the above second human face recognition model includes the first human face recognition model and a human face key point detection model, referring to FIG. 4d. As shown in FIG. 4d, firstly, the first image is inputted into the first face recognition model to obtain the image of the human face area in the first image, and then the image of the human face area in the first image is inputted into the human face key point detection model to obtain position information of key parts of the human face. Then the image of the human face area is rotated based on the position information of the key parts of the human face to obtain a standard face image. Then the standard face image is inputted into the face mask recognition model, and a recognition result of the face mask is outputted through image analysis of the face mask recognition model.

It can be understood that the recognition difficulty of a face mask for a standard human face image is lower than that for other poses.

As can be seen from the above description, compared with the first two examples (the example shown in FIG. 4a or the example shown in FIG. 4b), in the latter two examples (the example shown in FIG. 4c or the example shown in FIG. 4d) the learning of key parts in the face image is added, thereby reducing the recognition difficulty of the subsequent face mask recognition model, reducing the computational amount of the face mask recognition model, and improving the rate and accuracy of face mask detection.

Optionally, in some embodiments, before inputting the image into the face mask recognition model, the human face recognition model or the human face key point detection model, the image to be inputted may also be pre-processed. The pre-processing includes cutting, scaling, rotating and the like of the image, thereby ensuring that the input image meets input requirements of the various models.

In this embodiment, step 203 is performed when it is determined that the human face does not wear the face mask, and step 204 is performed when it is determined that the human face wears the face mask.

Step 203, displaying prompt information on the first image, where the prompt information is used to prompt the user to wear the face mask.

In this embodiment, the prompt information can be displayed at any position on the first image, for example, at the top, center, bottom and other positions of the first image. The purpose of the prompt information is to make the user put on the face mask, and the specific form of the prompt information is not limited by this embodiment. Exemplarily, the prompt information may be "Wear a face mask", "Please put on a face mask, see the effect" and other text prompt information, and may also be voice prompt information.

Step 204, superimposing a first material on the human face area in the first image.

In this embodiment, the first material may be a preset material or a user-defined material, which is not limited by this embodiment. It should be noted that the preset material may be set considering cultural differences of different regions and preferences of different people.

The format of the material provided by this embodiment includes but is not limited to, formats such as picture, video, animation, text, etc. The material provided by this embodiment includes a 2D material and a 3D material, and may be a dynamic material or a static material, which is not limited by this embodiment.

Figure 5:
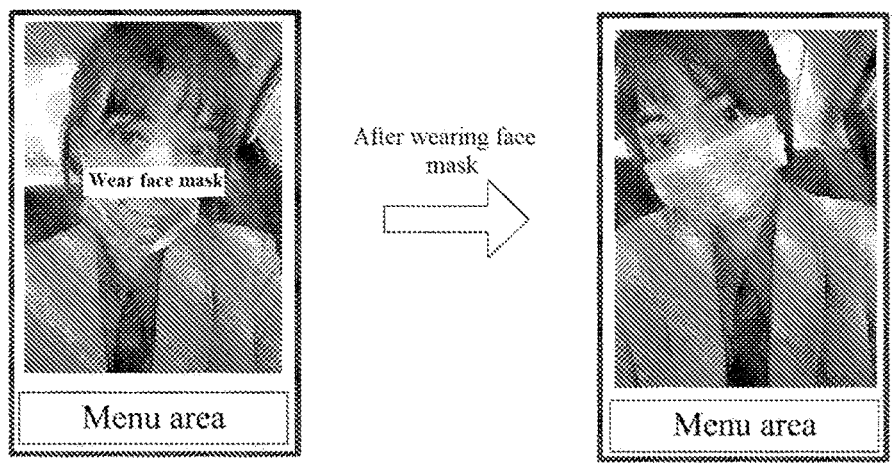
FIG. 5 is a schematic diagram of an interface change provided by an embodiment of the present disclosure.

Exemplarily, FIG. 5 is a schematic diagram of an interface change provided by an embodiment of the present disclosure. As shown in FIG. 5, when it is detected that the user's face in the current image does not wear a face mask, prompt information "Wear a face mask" can be superimposed at any position on the current image. For example, the prompt information "Wear a face mask" is superimposed at the center of the current image shown in FIG. 5. In a subsequent image, if it is detected that the user's face wears a face mask, a display material, such as a pattern sticker shown in FIG. 5, can be superimposed on an area of the face mask worn by the user. As an example, a menu area can also be included at the bottom of the interface shown in FIG. 5. The menu area includes a material selection area, a text input area, etc. Please refer to the following embodiments for details, which will not be detailed here.

As can be seen from the above description, using the information display method provided by this embodiment, the first image including the human face in the video is acquired; whether the human face in the first image wears a face mask is determined; when it is determined that the human face does not wear the face mask, the prompt information is displayed on the first image, the prompt information being used to prompt the user to wear the face mask; and when it is determined that the human face wears the face mask, the first material is superimposed on the human face area of the first image. In this embodiment, the user can be prompted to wear the face mask when the user uses the camera to take a picture, and after the user wears the face mask, the preset material or user-defined material is superimposed on the face mask worn by the user, so as to avoid the problem that the user cannot use facial special effects or express information after wearing the face mask, thereby improving use experience of the user.

Based on the above embodiments, it is known that in order to improve the efficiency and accuracy of recognizing whether the human face in the image wears the face mask, the pre-trained face mask recognition model can be used to process and analyze the image. A training process of the face mask recognition model is described in detail below.

Figure 6:
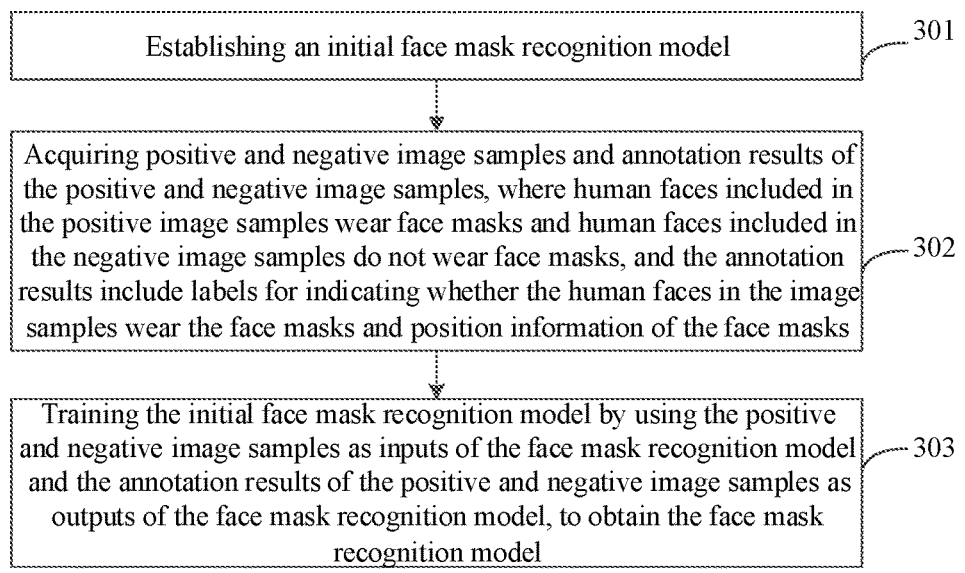
FIG. 6 is a schematic flowchart of training of a face mask recognition model provided by an embodiment of the present disclosure.

Exemplarily, FIG. 6 is a schematic flowchart of training of a face mask recognition model provided by an embodiment of the present disclosure. A training method of this embodiment can be applied in a terminal device or a server. As shown in FIG. 6, a model training method includes the following steps.

Step 301, establishing an initial face mask recognition model. The recognition model can use any kind of deep learning models, or, lightweight machine learning models.

Step 302, acquiring positive and negative image samples and annotation results of the positive and negative image samples. Human faces included in the positive image samples wear face masks and human faces included in the negative image samples do not wear face masks. The annotation results include labels for indicating whether the human faces in the image samples wear the face masks, and position information of the face masks.

In this embodiment, the positive image samples are pictures of people wearing face masks under various shooting conditions, and the negative image samples are pictures of people not wearing face masks under various shooting conditions. Specifically, the positive image samples collected in this embodiment include: pictures of people wearing face masks at different shooting angles, such as flat view, overhead view, elevation view, etc.; pictures in different human face postures, such as front face, half side face, side face, etc.; pictures under different lighting conditions, such as indoor yellow light, white light, outdoor sunshine, shadow, etc.; pictures of different types of face masks, such as medical surgical face masks, N95 face masks, cotton face masks, etc.; and pictures of different shapes of face masks, such as square face masks, round face masks, etc., to fully collect various scenes of people wearing face masks.

Figure 7:
FIG. 7 is a schematic diagram of key point annotation of a face mask provided by an embodiment of the present disclosure.

The annotation work of the above image samples may be done by an annotation team; or may be done by performing rough annotation using picture recognition methods and then performing manual correction; or may be done by classify pictures and then performing uniform annotation on the classified image samples. The above annotation work may be used alone or in combination. For a picture of a person wearing a face mask, multiple key points of the face mask are mainly annotated, for example, multiple key points on the horizontal centerline of the face mask and multiple key points on the vertical centerline of the face mask are annotated, which can be seen in FIG. 7.

As an example, the label for indicating whether the human face in the image sample wears the face mask may specifically be a label value, and the label value may include 0 and 1, where 0 indicates that the human face in the image sample does not wear the face mask, and 1 indicates that the human face in the image sample wears the face mask.

Figure 8:
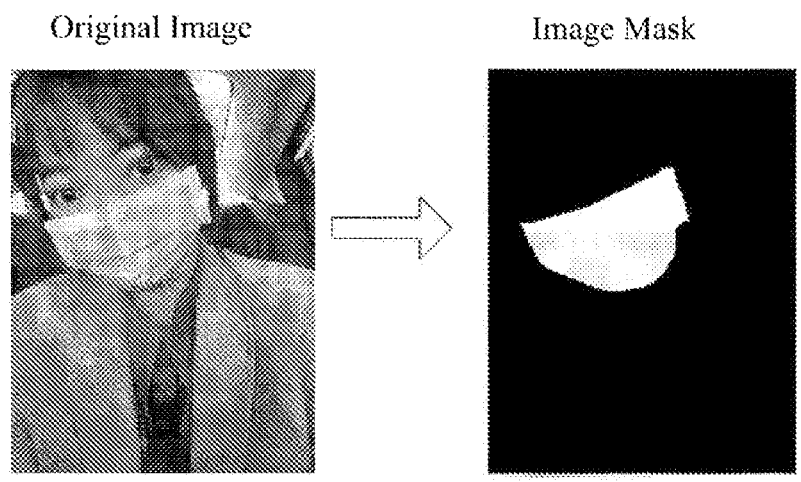
FIG. 8 is a schematic diagram of an original image containing a face mask and an image mask provided by an embodiment of the present disclosure.

The position information of the face mask in the above annotation result includes at least one of key point information of the face mask and image mask information of the face mask. As an example, manually annotated key points may include multiple key points on the horizontal centerline of the face mask and multiple key points on the vertical centerline of the face mask. The image mask information of the face mask refers to a binary image of the face mask in the image sample, which can be used to indicate the position information of the face mask in the image, and FIG. 8 can be referred to for details.

Step 303, training the initial face mask recognition model by using the positive and negative image samples as inputs of the face mask recognition model and the annotation results of the positive and negative image samples as outputs of the face mask recognition model, to obtain the face mask recognition model.

Optionally, an adam optimizer may be used for the face mask recognition model. By setting a learning rate (e.g. 0.01) and a penalty value of weights (e.g. 1e-5), using a multi-step curve for a decreasing trend of the learning rate, and setting a batch_size (e.g. 96), the trained face mask recognition model is finally obtained.

As can be seen from the above description, the training process of the face mask recognition model provided by this embodiment requires acquiring a large number of image samples. The image samples should cover various shooting conditions, including different shooting angles, human face postures, lighting conditions, face mask styles, etc. The model training is performed after manual annotation, so as to train a model with good recognition effect.

Based on the embodiment of FIG. 2, for personalized requirements of users wearing face masks, the users can customize the first material displayed on the face mask when wearing the face mask, and in addition, personalized settings of a second material displayed on the face mask when not wearing the face mask can be added.

In an embodiment of the present disclosure, after superimposing the first material on the area where the second object is located in the first image, the information display method further includes: when it is determined that the human face does not wear the face mask in a second image after the first image, removing the first material and superimposing a second material in the second image, where the second material is different from the first material.

The second material may be a user-defined material or a server-default material. Optionally, the second material can be superimposed on any position of the second image. Exemplarily, the second material can be superimposed at a face area of the person, a head area of the person, a background area and other positions in the second image. The material format and specific expression form of the second material are the same as those described in step 204 of the above embodiment, and details can be found above, which will not be repeated here. Certainly, the second material may also be understood as other special effects, such as user-defined makeup effects, face-lifting effects, etc.

Figure 9:
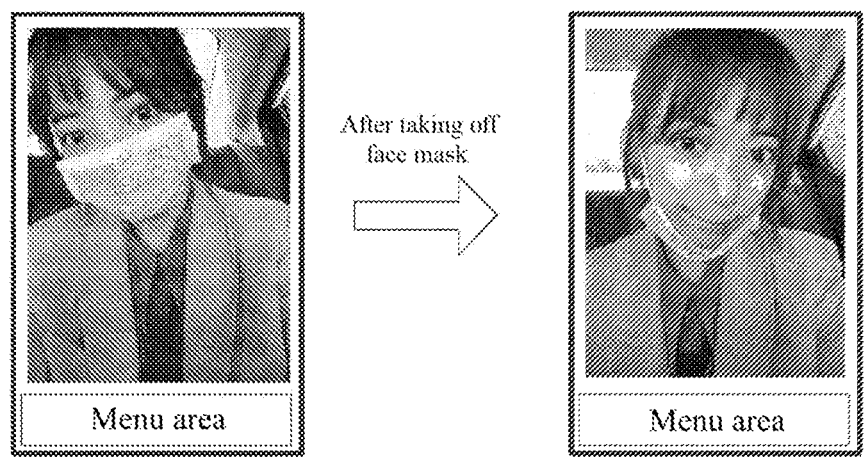
FIG. 9 is a schematic diagram of an interface change provided by embodiments of the present disclosure.

Exemplarily, FIG. 9 is a schematic diagram of an interface change provided by an embodiment of the present disclosure. As shown in FIG. 9, when the user takes off the face mask in the left image and displays her whole face, the face mask recognition model can detect that the user's face in the current image (right image) does not wear a face mask, then the pattern sticker displayed in the left image can be removed and a new material can be superimposed on the user's face area in the current image, such as a star sticker on an area below the user's eyes shown in FIG. 9. The superimposed new material is the above second material.

As can be seen from the above description, the user can customize the first material displayed on the face mask when wearing the face mask, and also customize the second material displayed on the picture when not wearing the face mask. Using the above examples, an interesting operation for the user wearing the face mask is realized, which can enhance the use experience of the user.

In an embodiment of the present disclosure, based on the embodiment shown in FIG. 2, in order to meet personalized requirements of different users, a switching operation of the user for the current face mask area material can be added, thereby adding an interesting operation and enhancing the use experience of the user.

Figure 10:
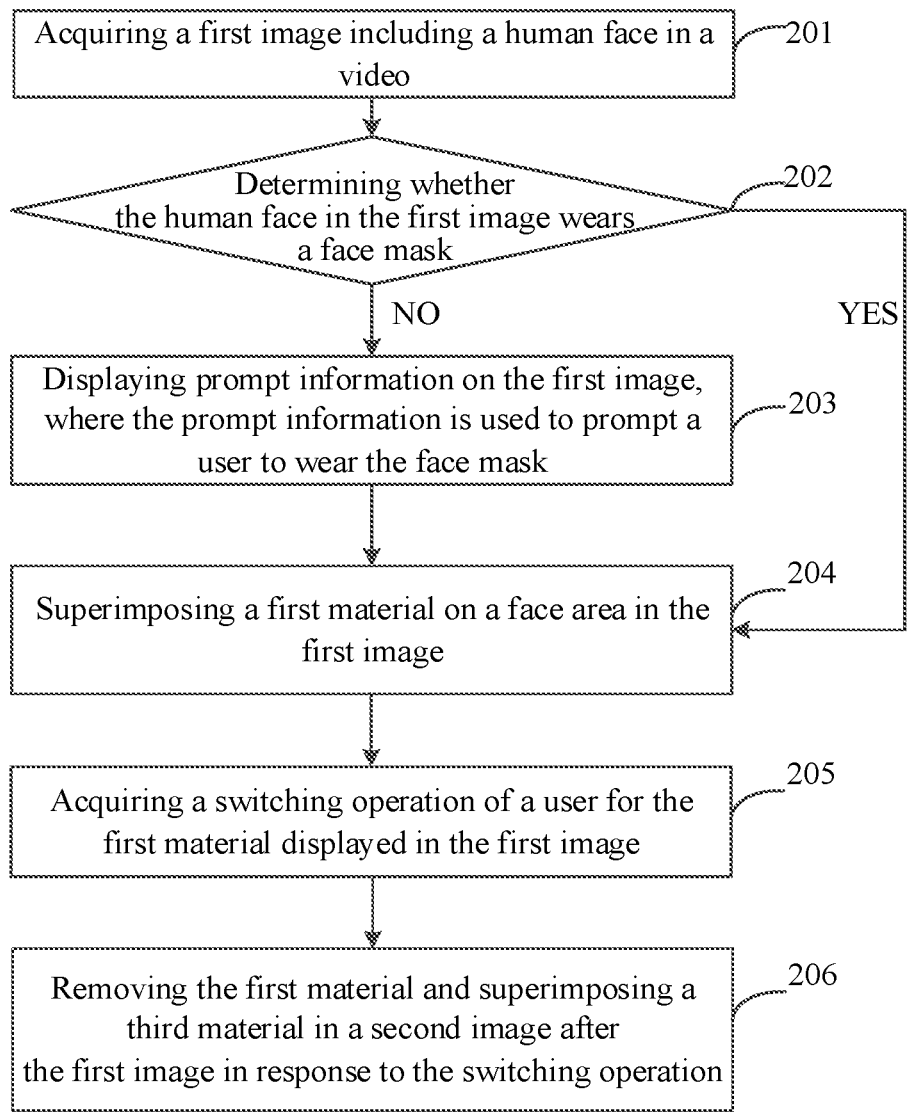
FIG. 10 is a schematic flowchart of an information display method provided by an embodiment of the present disclosure.

FIG. 10 is a schematic flowchart of an information display method provided by an embodiment of the present disclosure. As shown in FIG. 10, after step 204 of the embodiment in FIG. 2, i.e., after the first material is superimposed on the human face area in the first image, the information display method may further include the following steps.

Step 205, acquiring a switching operation of the user for the first material displayed in the first image.

Step 206, removing the first material and superimposing a third material in a second image after the first image in response to the switching operation.

The third material is different from the first material. The third material may be a server-preset material or a user-defined material, which is not limited by this embodiment. Optionally, the third material can be superimposed on any position of the second image. The format and specific expression form of the third material are the same as those described in step 204 of the above embodiment, and the details can be found above, which will not be repeated here. Certainly, the third material may also be understood as other special effects, such as user-defined makeup effects, face-lifting effects, etc.

In this embodiment, the switching operation of the user for the first material displayed in the first image is used to trigger switching of a picture material, and the switching operation includes the following possible implementations.

In an embodiment of the present disclosure, acquiring the switching operation of the user for the first material displayed in the first image includes: acquiring a gesture operation of the user in the first image, where the gesture operation is used to trigger the switching of the picture material. Exemplarily, when the user wears a face mask and the first material is superimposed on the face mask, the user can trigger the switching of the material on the face mask through a gesture operation such as making a hand heart, making a scissor gesture, or opening palm. In this example, the user's intention is determined through gesture recognition technology; a material matching the user's intention is searched for from a material library; and the material on the face mask is switched.

To achieve the above effect, optionally, prompt information can be displayed on the first image, and the prompt information is used to prompt the user to perform the gesture operation. For example, text such as "Try to make a hand heart" and "Try to open palm" can be displayed at any position in the first image, and a sticker of "Make a hand heart", "Palm" and the like can be displayed at any position in the first image. Optionally, the user can also be prompted to perform the gesture operation by playing a voice prompt.

In an embodiment of the present disclosure, acquiring the switching operation of the user for the first material displayed in the first image includes: acquiring a facial action of the user in the first image, where the facial action is used to trigger the switching of the picture material. Exemplarily, when the user wears a face mask and the first material is superimposed on the face mask, the user can trigger the switching of the material on the face mask through a facial action such as blinking, eyebrow-raising. In this example, the user's intention is determined through face recognition technology; a material matching the user's intention is searched for from a material library; and the material on the face mask is switched.

In an embodiment of the present disclosure, acquiring the switching operation of the user for the first material displayed in the first image includes: acquiring a head action of the user in the first image, where the head action is used to trigger the switching of the picture material. Exemplarily, when the user wears a face mask and the first material is superimposed on the face mask, the user can trigger the switching of the material on the face mask through a head action such as nodding, shaking the head. In this example, the user's intention is determined through hand recognition technology; a material matching the user's intention is searched for from a material library; and the material on the face mask is switched.

In an embodiment of the present disclosure, acquiring the switching operation of the user for the first material displayed in the first image includes: acquiring voice data of the user in the first image, where the voice data is used to trigger the switching of the picture material. Exemplarily, when the user wears a face mask and the first material is superimposed on the face mask, the user can trigger the switching of the material on the face mask through voice control. For example, the face mask currently worn by the user is superimposed with the pattern sticker shown in FIG. 5, and when the user inputs a voice of "Keep smiling", the pattern sticker on the face mask is switched to a smiley face sticker. In this example, the user's intention is determined through voice recognition technology; a material matching the user's intention is searched for from a material library; and the material on the face mask is switched.

Figure 11:
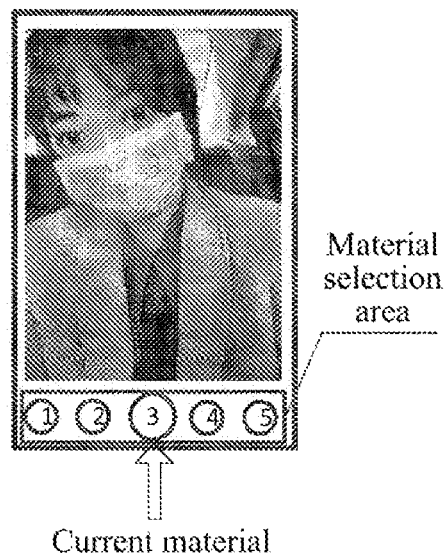
FIG. 11 is a schematic diagram of an interface provided by embodiments of the present disclosure.

In an embodiment of the present disclosure, acquiring the switching operation of the user for the first material displayed in the first image includes: acquiring a selection operation of the user in a material selection area of an interface, where the selection operation is used to trigger the switching of the picture material. The material selection area includes various types of material resources. FIG. 11 is a schematic diagram of an interface provided by an embodiment of the present disclosure. As shown in FIG. 11, the material selection area at the bottom of the interface includes materials 1, 2, 3, 4, and 5 (it should be noted that the actual display of materials in the figure is previews of the materials). The current material displayed on the user's face mask is material 3, and the user can select other materials in the material selection area to trigger the switching of material 3 on the current face mask.

In an embodiment of the present disclosure, acquiring the switching operation of the user for the first material displayed in the first image includes: acquiring an input operation of the user in a text input area of the interface, where the input operation is used to trigger the switching of the picture material. Exemplarily, when the user wears a face mask and the first material is superimposed on the face mask, the user can trigger the switching of the material on the face mask by inputting text information or an expression in the text input area of the interface.

Optionally, the third material may be the text information or the expression inputted by the user in the text input area of the interface. The text information includes at least one of a number, a letter, a symbol, and a character.

Figure 12:
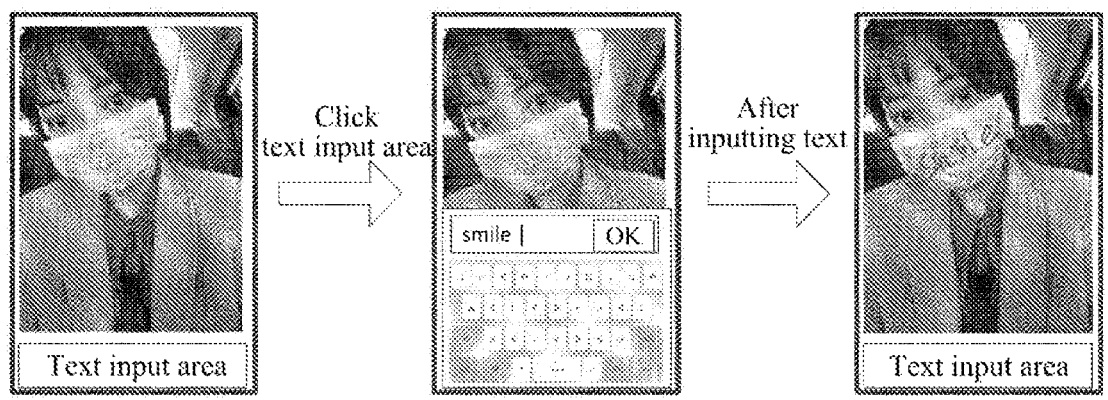
FIG. 12 is a schematic diagram of an interface change provided by embodiments of the present disclosure.

Exemplarily, FIG. 12 is a schematic diagram of an interface change provided by an embodiment of the present disclosure. As shown in FIG. 12, when the user wears a face mask and the first material is superimposed on the face mask, the user can click the text input area at the bottom of the interface to trigger a virtual keyboard to pop up. The user inputs text information on the virtual keyboard, for example, the user inputs an English word "smile". After clicking "OK", the pattern sticker on the face mask is switched to the text "smile" inputted by the user.

As can be seen from the above description, when the user's face mask has been superimposed with the material, the user may also switch the material on the person's face mask in the picture through the preset operation manner, such as the gesture operation, the facial action, the head action, the voice control, the text input, the material interface selection, or other manners. Using the above example, an interesting operation of the user wearing the face mask is achieved, which can enhance the use experience of the user.

Figure 13:
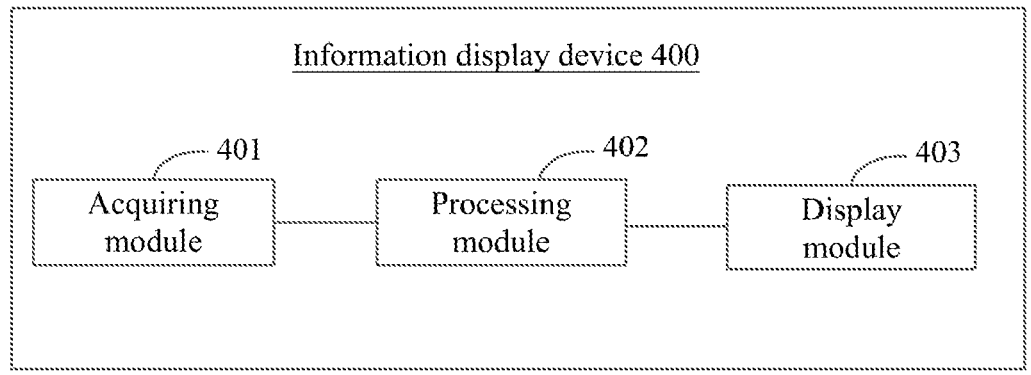
FIG. 13 is a structural block diagram of an information display device provided by an embodiment of the present disclosure.

Corresponding to the information display method of the above embodiments, FIG. 13 is a structural block diagram of an information display device provided by an embodiment of the present disclosure. For convenience of explanation, only the parts related to the embodiments of the present disclosure are shown. As shown in FIG. 13, the information display device 400 provided in this embodiment includes: an acquiring module 401, a processing module 402, and a display module 403. Where, the acquiring module 401 is configured to acquire a first image including a first object in a video;

the processing module 402 is configured to determine whether a second object is present in the first image;

the display module is configured to superimpose a first material on an area where the second object is located in the first image, when it is determined that the second object is present in the first image and that the second object satisfies a preset positional relationship with the first object.

In an embodiment of the present disclosure, the first object is a human face and the second object is a face mask; the preset positional relationship is specifically that: the human face wears the face mask.

In an embodiment of the present disclosure, the acquiring module 401 is specifically configured to acquire a target image including the human face in the first image;

the processing module 402 is specifically configured to input the target image into a face mask recognition model to obtain a recognition result, where the recognition result is used to indicate whether the human face wears the face mask, and the face mask recognition model is a lightweight machine learning model.

In an embodiment of the present disclosure, the face mask recognition model includes a shuffle channel module, a channel slice module, two 1×1 convolution modules, a 3×3 convolution module, and a channel concat module.

In an embodiment of the present disclosure, the processing module 402 is specifically configured to:

input the first image into a first human face recognition model to obtain a first image of a face area in the first image, and use the first image as the target image.

In an embodiment of the present disclosure, the processing module 402 is specifically configured to:

input the first image into a second human face recognition model to obtain a first image of a face area in the first image and key point information of the face area;

perform rotation processing on the first image according to the key point information to obtain a second image, and use the second image as the target image.

In an embodiment of the present disclosure, the acquiring module 401 is further configured to:

acquire an established initial face mask recognition model;

acquire positive and negative image samples and annotation results of the positive and negative image samples, where human faces included in the positive image samples wear face masks and human faces included in the negative image samples do not wear face masks, and the annotation results include labels for indicating whether the human faces in the image samples wear the face masks and position information of the face masks;

the processing module 402 is further configured to: train the initial face mask recognition model by using the positive and negative image samples as inputs of the face mask recognition model and the annotation results of the positive and negative image samples as outputs of the face mask recognition model, to obtain the face mask recognition model.

In an embodiment of the present disclosure, after the display module 403 superimposes the first material on the area where the second object is located in the first image, the display module 403 is further configured to remove the first material and superimpose a second material in a second image after the first image when the processing module 402 determines that the second object is not present in the second image, where the second material is different from the first material.

In an embodiment of the present disclosure, after the display module 403 superimposes the first material on the area where the second object is located in the first image, the acquiring module 401 is further configured to:

acquire a switching operation of a user for the first material displayed in the first image;

the display module 403 is further configured to remove the first material and superimpose a third material in the second image after the first image in response to the switching operation, where the third material is different from the first material.

In an embodiment of the present disclosure, the switching operation includes any one of the following: a gesture operation, a facial action, a head action, a voice control, a selection operation in a material selection area of an interface, and an input operation in a text input area of the interface.

In an embodiment of the present disclosure, the third material is text information or an expression inputted by the user in the text input area of the interface.

In an embodiment of the present disclosure, when the processing module 402 determines that the second object is not present in the first image, the display module 403 is further configured to display prompt information on the first image, where the prompt information is used to prompt the user to wear the second object.

The information display device provided in this embodiment can be used to perform the technical solutions of the above method embodiments, and the implementation principles and technical effects thereof are similar and will not be repeated here in this embodiment.

Figure 14:
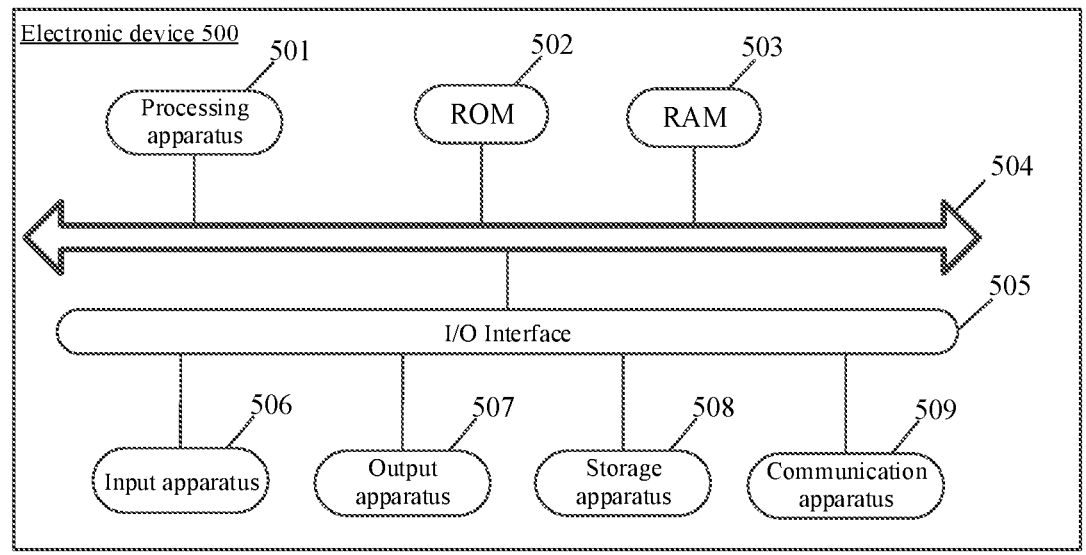
FIG. 14 is a schematic diagram of a hardware structure of an electronic device according to an embodiment of the present disclosure.

Referring to FIG. 14, FIG. 14 shows a schematic structural diagram of an electronic device 500 suitable for implementing embodiments of the present disclosure. The electronic device 500 may be a terminal device or a server. The terminal device may include, but is not limited to: a mobile terminal such as a mobile phone, a notebook computer, a digital broadcast receiver, a personal digital assistant (PDA for short), a portable android device (PAD for short), a portable media player (PMP for short), an in-vehicle terminal (e.g., an in-vehicle navigation terminal) and so on, and a fixed terminal such as a digital TV, a desktop computer and so on. The electronic device shown in FIG. 14 is only an example, and should not bring any limitation to the functions and the use range of the embodiments of the present disclosure.

As shown in FIG. 14, the electronic device 500 may include a processing apparatus (such as a central processor, a graphics processor, etc.) 501, which may execute various appropriate actions and processing according to a program stored in a read only memory (ROM for short) 502 or a program loaded into a random access memory (RAM for short) 503 from a storage apparatus 508. In the RAM 503, various programs and data necessary for operations of the electronic device 500 are also stored. The processing apparatus 501, the ROM 502 and the RAM 503 are connected to each other through a bus 504. An input/output (I/O) interface 505 is also connected to the bus 504.

Usually, the following apparatuses can be connected to the I/O interface 505: an input apparatus 506 including, such as, a touch screen, a touchpad, a keyboard, a mouse, a camera, a microphone, an accelerometer, a gyroscope, etc.; an output apparatus 507 including, such as, a liquid crystal display (LCD for short), a speaker, a vibrator, etc.; the storage apparatus 508 including, such as, a magnetic tape, a hard disk, etc.; and a communication apparatus 509. The communication apparatus 509 may allow the electronic device 500 to communicate wirelessly or through wires with other devices to exchange data. Although FIG. 14 shows the electronic device 500 having various apparatuses, it should be understood that it is not required to implement or have all of the apparatuses illustrated. More or fewer apparatuses may alternatively be implemented or provided.

In particular, according to the embodiments of the present disclosure, the processes described above with reference to the flowcharts can be implemented as a computer software program. For example, an embodiment of the present disclosure includes a computer program product including a computer program carried on a computer-readable medium, where the computer program contains program code for executing the methods shown in the flowcharts. In such embodiment, the computer program can be downloaded and installed from a network through the communication apparatus 509, or installed from the storage apparatus 508, or installed from the ROM 502. When the computer program is executed by the processing apparatus 501, the above functions defined in the methods of the embodiments of the present disclosure are executed.

An embodiment of the present disclosure further includes a computer program, where the computer program is stored in a readable storage medium, from which one or more processors of an electronic device can read the computer program, and the one or more processors execute the computer program to cause the electronic device to execute the solution provided by any one of the above embodiments.

It should be noted that the above computer-readable medium in the present disclosure may be a computer-readable signal medium or a computer-readable storage medium or any combination of the two. The computer-readable storage medium may be, for example, but not limited to, an electrical, magnetic, optical, electromagnetic, infrared or semiconductor system, apparatus or device, or any combination of the above. More specific examples of the computer-readable storage medium may include, but are not limited to, an electrical connection with one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above. In the present disclosure, the computer-readable storage medium may be any tangible medium containing or storing a program, where the program can be used by, or used in connection with, an instruction execution system, apparatus or device. And in the present disclosure, the computer-readable signal medium may include a data signal propagated in baseband or as a part of a carrier wave, in which computer-readable program code is carried. Such a propagated data signal may take a variety of forms, including but not limited to an electromagnetic signal, an optical signal, or any suitable combination of the above. The computer-readable signal medium may also be any computer-readable medium other than the computer-readable storage medium, and the computer-readable signal medium can send, propagate, or transmit a program for use by, or use in combination with, an instruction execution system, apparatus or device. The program code contained on the computer-readable medium may be transmitted using any suitable medium including, but not limited to, an electrical wire, an optical cable, RF (radio frequency) or the like, or any suitable combination of the above.

The above computer-readable medium may be included in the above electronic device, or may exist alone without being assembled into the electronic device.

The above computer-readable medium carries one or more programs, and the one or more programs. When the one or more programs are executed by the electronic device, the electronic device is caused to execute the methods shown in the above embodiments.

The computer program code for executing the operations of the present disclosure can be written in one or more programming languages or a combination thereof, where the programming languages include object-oriented programming languages such as Java, Smalltalk, C++, and also include conventional procedural programming languages such as "C" language or similar programming languages.

The program code may be executed entirely on a user computer, partly on a user computer, as a stand-alone software package, partly on a user computer and partly on a remote computer, or entirely on a remote computer or a server. In a case involving a remote computer, the remote computer can be connected to the user computer through any kind of networks, including a local area network (LAN for short) or a wide area network (WAN for short), or can be connected to an external computer (for example, connected through the Internet using an Internet service provider).

The flowcharts and block diagrams in the drawings illustrate architectures, functions and operations of possible implementations of systems, methods and computer program products in accordance with various embodiments of the present disclosure. At this point, each block in the flowcharts or block diagrams may represent a module, program segment, or a portion of code that contains one or more executable instructions for implementing a specified logical function. It should also be noted that in some alternative implementations, the functions marked in the blocks may also occur in a different order than those marked in the drawings. For example, two blocks shown one after the other can actually be executed in parallel substantially, or they may sometimes be executed in an opposite order, depending on functions involved. It should still be noted that each block in the block diagrams and/or flowcharts, and a combination of blocks in the block diagrams and/or flowcharts, may be implemented with a dedicated hardware-based system that performs specified functions or operations, or may be implemented with a combination of dedicated hardware and computer instructions.

The involved modules described in the embodiments of the present disclosure can be implemented by software or hardware. Names of the modules do not constitute a limitation on the units per se in some cases. For example, the acquiring module may also be described as "a module for acquiring a first image including a first object in a video".

The above functions described herein may be performed at least in part by one or more hardware logic components. For example, without limitation, exemplary types of hardware logic components that may be used include: a field programmable gate array (FPGA), an application-specific integrated circuit (ASIC), an application-specific standard product (ASSP), a system on chip (SOC), a complex programmable logic device (CPLD), etc.

In the context of the present disclosure, a machine-readable medium may be a tangible medium that may contain or store a program for use by, or use in connection with, an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the above contents. More specific examples of the machine-readable storage medium may include an electrical connection based on one or more wires, a portable computer disk, a hard disk, a random access memory (RAM), a read only memory (ROM), an electrical programmable read-only memory (EPROM or flash memory), an optical fiber, a portable compact disc read only memory (CD-ROM), an optical storage device, a magnetic storage device, or any suitable combination of the above contents.

In a first aspect, according to one or more embodiments of the present disclosure, an information display method is provided, including:

acquiring a first image including a first object in a video;

determining whether a second object is present in the first image;

when it is determined that the second object is present in the first image and that the second object satisfies a preset positional relationship with the first object, superimposing a first material on an area where the second object is located in the first image.

According to one or more embodiments of the present disclosure, the first object is a human face and the second object is a face mask; the preset positional relationship is specifically that: the human face wears the face mask.

According to one or more embodiments of the present disclosure, determining whether the second object is present in the first image includes:

acquiring a target image including the human face in the first image;

inputting the target image into a face mask recognition model to obtain a recognition result, where the recognition result is used to indicate whether the human face wears the face mask, and the face mask recognition model is a lightweight machine learning model.

According to one or more embodiments of the present disclosure, the face mask recognition model includes: a shuffle channel module, a channel slice module, two 1×1 convolution modules, a 3×3 convolution module, and a channel concat module.

According to one or more embodiments of the present disclosure, acquiring the target image including the human face in the first image includes:

inputting the first image into a first human face recognition model to obtain a first image of a face area in the first image, and using the first image as the target image.

According to one or more embodiments of the present disclosure, acquiring the target image including the human face in the first image includes:

inputting the first image into a second human face recognition model to obtain a first image of a face area in the first image and key point information of the face area;

performing rotation processing on the first image according to the key point information to obtain a second image, and using the second image as the target image.

According to one or more embodiments of the present disclosure, a training process of the face mask recognition model includes:

establishing an initial face mask recognition model;

acquiring positive and negative image samples and annotation results of the positive and negative image samples, where human faces included in the positive image samples wear face masks and human faces included in the negative image samples do not wear face masks, and the annotation results include labels for indicating whether the human faces in the image samples wear the face masks and position information of the face masks;

training the initial face mask recognition model by using the positive and negative image samples as inputs of the face mask recognition model and the annotation results of the positive and negative image samples as outputs of the face mask recognition model, to obtain the face mask recognition model.

According to one or more embodiments of the present disclosure, after superimposing the first material on the area where the second object is located in the first image, the method further includes:

when it is determined that the second object is not present in a second image after the first image, removing the first material and superimposing a second material in the second image, wherein the second material is different from the first material.

According to one or more embodiments of the present disclosure, after superimposing the first material on the area where the second object is located in the first image, the method further includes:

acquiring a switching operation of a user for the first material displayed in the first image;

removing the first material and superimposing a third material in a second image after the first image in response to the switching operation, where the third material is different from the first material.

According to one or more embodiments of the present disclosure, the switching operation includes any one of the following: a gesture operation, a facial action, a head action, a voice control, a selection operation in a material selection area of an interface, and an input operation in a text input area of the interface.

According to one or more embodiments of the present disclosure, the third material is text information or an expression inputted by the user in the text input area of the interface.

According to one or more embodiments of the present disclosure, the method further includes:

when it is determined that the second object is not present in the first image, displaying prompt information on the first image, where the prompt information is used to prompt the user to wear the second object.

In a second aspect, according to one or more embodiments of the present disclosure, an information display device is provided, including:

an acquiring module, configured to acquire a first image including a first object in a video;

a processing module, configured to determine whether a second object is present in the first image;

a display module, configured to superimpose a first material on an area where the second object is located in the first image, when it is determined that the second object is present in the first image and that the second object satisfies a preset positional relationship with the first object.

According to one or more embodiments of the present disclosure, the first object is a human face and the second object is a face mask; the preset positional relationship is specifically that: the human face wears the face mask.

According to one or more embodiments of the present disclosure, the acquiring module is specifically configured to acquire a target image including the human face in the first image;

the processing module is specifically configured to input the target image into a face mask recognition model to obtain a recognition result, where the recognition result is used to indicate whether the human face wears the face mask, and the face mask recognition model is a lightweight machine learning model.

According to one or more embodiments of the present disclosure, the face mask recognition model includes: a shuffle channel module, a channel slice module, two 1×1 convolution modules, a 3×3 convolution module, and a channel concat module.

According to one or more embodiments of the present disclosure, the processing module is specifically configured to:

input the first image into a first human face recognition model to obtain a first image of a face area in the first image, and use the first image as the target image.

According to one or more embodiments of the present disclosure, the processing module is specifically configured to:

input the first image into a second human face recognition model to obtain a first image of a face area in the first image and key point information of the face area;

perform rotation processing on the first image according to the key point information to obtain a second image, and use the second image as the target image.

According to one or more embodiments of the present disclosure, the acquiring module is further configured to:

acquire an established initial face mask recognition model;

acquire positive and negative image samples and annotation results of the positive and negative image samples, where human faces included in the positive image samples wear face masks and human faces included in the negative image samples do not wear face masks, and the annotation results include labels for indicating whether human faces in the image samples wear the face masks and position information of the face masks;

the processing module is further configured to train the initial face mask recognition model by using the positive and negative image samples as inputs of the face mask recognition model and the annotation results of the positive and negative image samples as outputs of the face mask recognition model, to obtain the face mask recognition model.

According to one or more embodiments of the present disclosure, after the display module superimposes the first material on the area where the second object is located in the first image, the display module is further configured to remove the first material and superimpose a second material in a second image after the first image when the processing module determines that the second object is not present in the second image, where the second material is different from the first material.

According to one or more embodiments of the present disclosure, after the display module superimposes the first material on the area where the second object is located in the first image, the acquiring module is further configured to:

acquire a switching operation of a user for the first material displayed in the first image;

the display module is further configured to remove the first material and superimpose a third material in a second image after the first image in response to the switching operation, where the third material is different from the first material.

According to one or more embodiments of the present disclosure, the switching operation includes any one of the following: a gesture operation, a facial action, a head action, a voice control, a selection operation in a material selection area of an interface, and an input operation in a text input area of the interface.

According to one or more embodiments of the present disclosure, the third material is text information or an expression inputted by the user in the text input area of the interface.

According to one or more embodiments of the present disclosure, when the processing module determines that the second object is not present in the first image, the display module is further configured to display prompt information on the first image, where the prompt information is used to prompt the user to wear the second object.

In a third aspect, according to one or more embodiments of the present disclosure, an electronic device is provided, which includes: at least one processor and a memory;

where the memory stores computer-execution instructions;

the at least one processor executes the computer-execution instructions stored in the memory to cause the at least one processor to execute the information display method according to the first aspect above and various possible designs of the first aspect.

In a fourth aspect, according to one or more embodiments of the present disclosure, a computer-readable storage medium is provided, where the computer-readable storage medium stores computer-execution instructions, and when a processor executes the computer-execution instructions, the information display method according to the first aspect above and various possible designs of the first aspect is implemented.

In a fifth aspect, according to one or more embodiments of the present disclosure, a computer program product including a computer program is provided, where the information display method according to the first aspect above and various possible designs of the first aspect is implemented when the computer program is executed by a processor.

In a sixth aspect, according to one or more embodiments of the present disclosure, a computer program is provided, where the information display method according to the first aspect above and various possible designs of the first aspect is implemented when the computer program is executed by a processor.

The above description is only a description of preferred embodiments of the present disclosure and applied technical principles. It should be understood by those skilled in the art that the disclosure scope involved in the present disclosure is not limited to the technical solution formed by the specific combination of the above technical features, but also covers other technical solutions formed by any combination of the above technical features or equivalent features thereof without departing from the above disclosure concept. For example, the technical solution formed by replacing the above features with the technical features with similar functions disclosed in (but not limited to) the present disclosure.

In addition, although the operations are depicted in a particular order, this should not be understood as requiring that the operations are performed in the particular order shown or in a sequential order. Under certain circumstances, multitasking and parallel processing may be advantageous. Similarly, although several specific implementation details are included in the above discussion, these should not be interpreted as limitations on the scope of the present disclosure. Certain features described in the context of a separate embodiment may also be implemented in a single embodiment in combination. On the contrary, various features described in the context of a single embodiment can also be implemented in multiple embodiments individually or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are merely exemplary forms for implementing the claims.

What is claimed is:

1. An information display method, comprising:
acquiring a first image comprising a first object in a video;
determining whether a second object is present in the first image;

when it is determined that the second object is present in the first image and that the second object satisfies a preset positional relationship with the first object, superimposing a first material on an area where the second object is located in the first image, wherein the first material comprises at least one of the following: video, animation, and text;

wherein the first object is a human face and the second object is a face mask, the preset positional relationship is specifically that: the human face wears the face mask; and wherein after superimposing the first material on the area where the second object is located in the first image, the method further comprises:

acquiring a switching operation of a user for the first material displayed in the first image;

removing the first material and superimposing a third material in a second image after the first image in response to the switching operation, wherein the third material is different from the first material and the third material is an expression inputted by the user in the text input area of an interface.

2. The method according to claim 1, wherein determining whether the second object is present in the first image comprises:

acquiring a target image comprising the human face in the first image;

inputting the target image to a face mask recognition model to obtain a recognition result, wherein the recognition result is used to indicate whether the human face wears the face mask, and the face mask recognition model is a lightweight machine learning model.

3. The method according to claim 2, wherein the face mask recognition model comprises: a shuffle channel module, a channel slice module, two 1×1 convolution modules, a 3×3 convolution module, and a channel concat module.

4. The method according to claim 2, wherein acquiring the target image comprising the human face in the first image comprises:

inputting the first image into a first human face recognition model to obtain a first image of a face area in the first image, and using the first image as the target image.

5. The method according to claim 2, wherein acquiring the target image comprising the human face in the first image comprises:

inputting the first image into a second human face recognition model to obtain a first image of a face area in the first image and key point information of the face area;

performing rotation processing on the first image according to the key point information to obtain a second image, and using the second image as the target image.

6. The method according to claim 2, wherein a training process of the face mask recognition model comprises:

establishing an initial face mask recognition model;

acquiring positive and negative image samples and annotation results of the positive and negative image samples, wherein human faces comprised in the positive image samples wear face masks and human faces comprised in the negative image samples do not wear face masks, and the annotation results comprise labels for indicating whether the human faces in the image samples wear the face masks and position information of the face masks;

training the initial face mask recognition model by using the positive and negative image samples as inputs of the face mask recognition model and the annotation results of the positive and negative image samples as outputs of the face mask recognition model, to obtain the face mask recognition model.

7. The method according to claim 1, wherein after superimposing the first material on the area where the second object is located in the first image, the method further comprises:

when it is determined that the second object is not present in a second image after the first image, removing the first material and superimposing a second material in the second image, wherein the second material is different from the first material.

8. The method according to claim 1, wherein the switching operation comprises any one of the following: a gesture operation, a facial action, a head action, a voice control, a selection operation in a material selection area of an interface, and an input operation in a text input area of the interface.

9. The method according to claim 1, wherein the third material is text information inputted by the user in the text input area of the interface.

10. The method according to claim 1, wherein the method further comprises:

when it is determined that the second object is not present in the first image, displaying prompt information on the first image, wherein the prompt information is used to prompt a user to wear the second object.

11. An information display device, comprising:

at least one processor and a memory;

wherein the memory stores computer-execution instructions;

the at least one processor executes the computer-execution instructions stored in the memory to cause the at least one processor to:

acquire a first image comprising a first object in a video;

determine whether a second object is present in the first image;

superimpose a first material on an area where the second object is located in the first image, when it is determined that the second object is present in the first image and that the second object satisfies a preset positional relationship with the first object, wherein the first material comprises at least one of the following: video, animation, and text;

wherein the first object is a human face and the second object is a face mask, the preset positional relationship is specifically that: the human face wears the face mask; and wherein after the first material is superimposed on the area where the second object is located in the first image the at least one processor executes the computer-execution instructions stored in the memory to further cause the at least one processor to:

acquire a switching operation of a user for the first material displayed in the first image;

the display module is further configured to remove the first material and superimpose a third material in a second image after the first image in response to the switching operation, where the third material is different from the first material and the third material is an expression inputted by the user in the text input area of an interface.

12. The device according to claim 11, wherein the at least one processor executes the computer-execution instructions stored in the memory to cause the at least one processor to:

acquire a target image comprising the human face in the first image;

input the target image to a face mask recognition model to obtain a recognition result, wherein the recognition result is used to indicate whether the human face wears the face mask, and the face mask recognition model is a lightweight machine learning model.

13. The device according to claim 12, wherein the face mask recognition model comprises: a shuffle channel module, a channel slice module, two 1×1 convolution modules, a 3×3 convolution module, and a channel concat module.

14. The device according to claim 12, wherein the at least one processor executes the computer-execution instructions stored in the memory to cause the at least one processor to:

input the first image into a first human face recognition model to obtain a first image of a face area in the first image, and use the first image as the target image.

15. The device according to claim 12, wherein the at least one processor executes the computer-execution instructions stored in the memory to cause the at least one processor to:

input the first image into a second human face recognition model to obtain a first image of a face area in the first image and key point information of the face area:

perform rotation processing on the first image according to the key point information to obtain a second image, and use the second image as the target image.

16. The device according to claim 12, wherein a training process of the face mask recognition model comprises:

establishing an initial face mask recognition model;

acquiring positive and negative image samples and annotation results of the positive and negative image samples, wherein human faces comprised in the positive image samples wear face masks and human faces comprised in the negative image samples do not wear face masks, and the annotation results comprise labels for indicating whether the human faces in the image samples wear the face masks and position information of the face masks;

training the initial face mask recognition model by using the positive and negative image samples as inputs of the face mask recognition model and the annotation results of the positive and negative image samples as outputs of the face mask recognition model, to obtain the face mask recognition model.

17. A non-transitory computer-readable storage medium, wherein the computer-readable storage medium stores computer-execution instructions, and when a processor executes the computer-execution instructions, the processor is caused to:

acquire a first image comprising a first object in a video;

determine whether a second object is present in the first image;

superimpose a first material on an area where the second object is located in the first image, when it is determined that the second object is present in the first image and that the second object satisfies a preset positional relationship with the first object, wherein the first material comprises at least one of the following: video, animation, and text;

wherein the first object is a human face and the second object is a face mask, the preset positional relationship is specifically that: the human face wears the face mask; and wherein after superimposing the first material on the area where the second object is located in the first image, when the processor executes the computer-execution instructions, the processor is further caused to:

acquire a switching operation of a user for the first material displayed in the first image;

remove the first material and superimposing a third material in a second image after the first image in response to the switching operation, wherein the third material is different from the first material and the third material is an expression inputted by the user in the text input area of the interface.

* * * * *